(12) United States Patent
Moser et al.

(10) Patent No.: US 9,500,335 B2
(45) Date of Patent: Nov. 22, 2016

(54) LIGHTING DEVICE FOR GENERATING A SEGMENTED LIGHT DISTRIBUTION

(71) Applicant: ZIZALA LICHTSYSTEME GMBH, Wieselburg (AT)

(72) Inventors: Andreas Moser, Haag (AT); Bernd Eichinger, Wieselburg (AT); Heimo Frank, Zwentendorf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 221 days.

(21) Appl. No.: 14/394,293

(22) PCT Filed: May 7, 2013

(86) PCT No.: PCT/AT2013/050102
§ 371 (c)(1),
(2) Date: Oct. 14, 2014

(87) PCT Pub. No.: WO2013/166537
PCT Pub. Date: Nov. 14, 2013

(65) Prior Publication Data
US 2015/0285456 A1 Oct. 8, 2015

(30) Foreign Application Priority Data
May 9, 2012 (AT) .............................. A 50166/2012

(51) Int. Cl.
 F21S 8/10 (2006.01)
 F21Y 101/00 (2016.01)
(52) U.S. Cl.
 CPC ............ *F21S 48/13* (2013.01); *F21S 48/1159* (2013.01); *F21S 48/1747* (2013.01); *B60Q 2300/056* (2013.01); *F21Y 2101/00* (2013.01)

(58) Field of Classification Search
 CPC ................... B60Q 2300/056; F21S 48/1159; F21S 48/13; F21S 48/14; F21S 48/1747; F21S 48/1752; F21S 48/1763; F21Y 2101/02
 See application file for complete search history.

(56) References Cited

U.S. PATENT DOCUMENTS

| 2003/0169599 A1 | 9/2003 | Natsume |
| 2008/0225539 A1 | 9/2008 | Fujiwara et al. |

(Continued)

FOREIGN PATENT DOCUMENTS

| DE | 102010020616 A1 | 11/2001 |
| EP | 2060442 A2 | 5/2009 |

(Continued)

OTHER PUBLICATIONS

First Office Action of the Austrian priority application No. A50166/2012 dated Mar. 1, 2013.

(Continued)

*Primary Examiner* — Ali Alavi
(74) *Attorney, Agent, or Firm* — Sutherland Asbill & Brennan LLP (57) ABSTRACT

The invention relates to a lighting device (1) for a motor vehicle, comprising two or more lighting units (2), wherein each lighting unit (2) comprises: at least one reflector (3) and at least one light source (4) paired with the at least one reflector (3), wherein light from the at least one light source (4) is emitted into a region in front of the vehicle via the corresponding at least one reflector (3) in the installed state of the lighting device (1), and wherein the sub-light distributions of the two or more lighting units (2) form a light distribution of the lighting device (1), wherein the sub-light distributions of the individual lighting units (2) are arranged adjacently to one another in the horizontal direction, and wherein the reflectors (3) of the lighting units (2) are designed in such a way that the sub-light distribution of each lighting unit (2) has at least one sharp vertical light-dark boundary.

24 Claims, 8 Drawing Sheets

(56) References Cited

U.S. PATENT DOCUMENTS

| | | | |
|---|---|---|---|
| 2008/0239744 A1* | 10/2008 | Nakada | B60Q 1/0041 362/516 |
| 2009/0073712 A1 | 3/2009 | Yamamura et al. | |
| 2010/0214782 A1* | 8/2010 | Allegri | F21S 10/00 362/249.07 |
| 2015/0204503 A1* | 7/2015 | Krenn | F21S 48/1159 362/514 |

FOREIGN PATENT DOCUMENTS

| | | |
|---|---|---|
| EP | 2278217 A1 | 1/2011 |
| EP | 2280215 A2 | 2/2011 |
| WO | 2012045775 A1 | 4/2012 |

OTHER PUBLICATIONS

International Search Report of PCT application No. PCT/AT2013/050102 dated Sep. 3, 2013.

* cited by examiner

LIGHTING DEVICE FOR GENERATING A SEGMENTED LIGHT DISTRIBUTION

The invention relates to a lighting device for a motor vehicle, comprising two or more lighting units.

The invention also relates to a headlight for a motor vehicle, comprising at least one such lighting device.

Lastly, the invention also relates to a headlight system having a left and a right headlight for producing an overall light distribution.

Such lighting devices for producing a segmented light distribution are known. Each of the lighting units of the lighting device produces one or more light segments (sub-light distributions) of the light distribution, segments in the light distribution can be masked out, that is to say not illuminated, by selectively switching on and off individual lighting units, or one or more segments can be illuminated selectively. By way of example, the segmented light distribution is a main beam distribution (here, the total main beam distribution is formed by two lighting devices, which are installed in a left and a right vehicle headlight), which is constructed from light segments arranged adjacently to one another horizontally.

The object of the invention is to specify a lighting device of simple design for this purpose.

This object is achieved with a lighting device mentioned in the introduction in that, in accordance with the invention, each lighting unit comprises: at least one reflector and at least one light source paired with the at least one reflector, wherein light from the at least one light source is emitted into a region in front of the vehicle via the corresponding at least one reflector in the installed state of the lighting device, and wherein the sub-light distributions of the two or more lighting units form a light distribution of the lighting device, wherein the sub-light distributions of the individual lighting units are arranged adjacently to one another in the horizontal direction, and wherein the reflectors of the lighting units are designed such that the sub-light distribution of each lighting unit has at least one sharp vertical light-dark boundary.

Here, "vertical" means that the LD boundary runs vertically with projection onto a vertical shield positioned in front of the lighting device, for example at a distance of 25 or 10 meters. Of course, this LD boundary lies in a generally horizontal plane in the light exposure on the carriageway. This is clearly evident to a person skilled in the art and is to serve here merely for clarification.

Here, in principle, the sub-light distributions of adjacent lighting units can be portrayed at a distance from one another, bordering one another directly or overlapping one another.

An arrangement at a distance from one another would then be conceivable when the gaps produced here are filled by a second lighting device (left and right lighting device or left and right headlight form an overall light distribution).

If the sub-light distributions border one another directly, which, however, can only be implemented with particularly straight and sharp LD boundaries, segments in the light exposure can be masked out optimally.

However, a variant in which the sub-light distributions overlap one another is generally preferred. A homogeneous light distribution can be produced in this way with the lighting device, and, if the overlap region is selected accordingly, there still remains sufficient clearance to mask out individual segments or to selectively illuminate certain segments.

In accordance with a specific embodiment of the invention, at least one of the reflectors, preferably all reflectors, is/are designed in such a way that the sub-light distribution(s) has/have exactly one vertical light-dark boundary.

In accordance with another embodiment, at least one of the reflectors, preferably all reflectors, is/are designed in such a way that the sub-light distribution(s) has/have two vertical light-dark boundaries.

The sharpness of the vertical light-dark boundary/boundaries can be optimised by suitably trimming the reflector surface. In this context, "optimised" means that the respective LD boundary runs as straight as possible in the sub-light exposure.

Depending on the design of the reflector (for the straightest possible light-dark line), the light-dark boundary may be distorted, that is to say with a form deviating from the vertical course; by suitably trimming the reflector in the region of the edge producing the light-dark boundary, such deviating courses can be selectively removed, such that a straight, vertical light-dark boundary is produced.

Either both edges can be designed so as to be sharp, or just one of the two edges, in the latter case ideally the inner edges, can be designed so as to be sharp, such that the outer edges remain unsharp. In any case, it is expedient if, with just one sharp edge in a sub-light exposure, all sub-light exposures have the sharp edge on the same side.

In the case of a left (right) headlight, the right (left) vertical light-dark boundary of the segment of the light distribution produced by the headlight is in each case the "inner" edge or light-dark boundary, and, in the case of a left (right) headlight, the left (right) edges are in each case the "outer" edges or light-dark boundaries.

Here, the term "sharp" design of the edge is to be understood to mean that the light-dark boundary produced by the edge is portrayed sharply in the light exposure.

The expression "make an edge sharp" refers here to the portrayal in the light exposure, that is to say the edge of the reflector is portrayed sharply.

Here, the inner light-dark boundary is preferably portrayed sharply, whereas the outer light-dark boundary is portrayed less sharply, so that a uniform, homogenous course of the intensity distribution outwardly is achieved in the overall light distribution.

If both edges, that is to say both vertical light-dark boundaries, are sharp, the homogeneity of the overall light distribution can be somewhat reduced, however, more masking scenarios can be realised.

If only the inner edge is sharp and the outer edge is left unsharp, this is advantageous for the homogeneity of the overall light distribution. However, the softer course and the generally greater width of the individual segments (sub-light exposures) can have a negative effect on the masking scenarios, since in some circumstances more than just one segment has to be switched off.

With the design, a compromise therefore generally has to be made between homogeneity of the light exposure and the sharpness of the edges.

In accordance with a cost-effective and simple variant, all lighting units produce a sub-light exposure of substantially identical form. In this case, all reflectors can generally be formed identically, such that advantages are provided in terms of the manufacture (only one type of reflectors), bearing mount, etc.

In accordance with another variant, the reflectors can be divided into groups each having at least one reflector, and wherein the reflectors are designed in such a way that all lighting units with reflectors of a group produce a sub-light exposure of substantially identical form, and the sub-light exposures of lighting units with reflectors from different groups differ from one another.

In this way, the light exposure produced with a lighting device can be improved, and at the same time the number of differently shaped reflectors can be kept low.

However, in view of an optimised light exposure of the lighting device, it may also be advantageous if the reflectors are designed in such a way that all lighting units produce a sub-light exposure differing from one another in terms of form.

Furthermore, the reflecting surface of one, more or all reflectors may be smooth.

Here, "smooth" means that the reflecting surface has no irregularities. In this way, the proportion of scattered light can be kept low, however, in some circumstances there may be limitations in the embodiment of the respective sub-light distribution.

However, the reflecting surface of one, more or all reflectors may also be segmented. Here, the segments may be arranged in a manner running vertically and/or horizontally and/or transversely.

The combination of smooth and segmented reflectors is of course also conceivable in principle.

By means of a segmentation, a free shaping of the light distribution is possible, and there is a higher number of degrees of freedom when producing the light distribution.

With a segmented reflector, the respective sub-light distribution can be optimised, however in some circumstances increased scattered light may occur at edges between the segments.

Furthermore, in accordance with a specific embodiment, the light sources of the lighting units each comprise at least one light-emitting diode, preferably two or more light-emitting diodes.

It is particularly advantageous if the light sources of the lighting units can be actuated independently of one another. In this way, the individual lighting units can be switched on and switched off independently of one another, and can possibly also be dimmed, such that the individual sub-light distributions can switch on and off individually.

It may also be advantageous if, in the case that two or more light-emitting diodes are provided for one light source, the light-emitting diodes can also be actuated independently of one another or the light-emitting diodes are combined in groups and the individual groups can be actuated independently of one another.

Each lighting unit thus produces one or more segments in the light exposure, and these individual segments of a lighting unit can then accordingly also be controlled independently of the other segments.

By use of a number of LED chips, which each comprise one or more light-emitting diodes, a number of light segments can be produced for a reflector. Here, all reflector segments are paired with all LED chips, that is to say each light-emitting diode generally emits light substantially onto the entire reflector.

By way of example, an arrangement formed of an LED chip with a reflector (with or without segmentation) produces a segment in the light distribution.

A number of LED chips with a reflector (with or with segmentation), wherein the LED chips cannot be actuated separately, also produces exactly one segment in the light distribution.

A number of LED chips, for example a number of x LED chips, with a reflector (with or without segmentation), wherein the LED chips can be actuated separately, allows the production of x segments in the light distribution.

As already mentioned above, it may also be advantageous if one or more light sources, in particular the light-emitting diodes of the light sources, can be dimmed.

It may be of significance in particular if at least the outer light sources can be dimmed. Here, the "outer" light sources (or lighting units) are those which produce the outer sub-light distributions, that is to say the sub-light distributions remote from the middle of the light distribution. In this way, the lateral extension of the light distribution of a lighting device can be optimally controlled.

In terms of a simple and standardised construction of a lighting device, it is advantageous if all light sources are arranged on a common mounting body. Here, each light source is preferably fitted on a heat sink, the heat sink and light source mounted thereon accordingly forming an interchangeable unit. These interchangeable units are supplemented by the corresponding reflectors and are fastened on the mounting body.

In addition, it may also be advantageous if at least one beam shield is paired with each light source of a lighting unit.

An optically effective shield edge of the beam shield is portrayed in the light exposure, such that a sharper LD line can be produced. In addition, the light that does not reach the reflector (due to the emission characteristics of the light-emitting diodes) is stopped by the beam shield, such that it cannot exit from the lighting unit.

The reflector is designed such that, even without a beam shield, a sharp light-dark boundary is produced in the light exposure. The beam shield is used in order to prevent a direct view of the light source. In addition, this beam shield can be used, by suitable positioning in the beam path and by suitable shaping, in order to change (optimise) the form of the vertical light-dark boundary. In addition, one or more further beam shields are introduced into the beam path in order to shape (optimise) one or both vertical light-dark boundaries.

In order to produce a segmented light distribution, such as a main beam distribution, it is advantageous if the reflectors and/or lighting units are arranged in a horizontal plane.

In accordance with a variant of the invention, the lighting units are oriented identically.

The light exposure of a lighting device may particularly advantageously be generated when the lighting units are rotated relative to one another in the horizontal direction.

The lighting units are thus each rotated about a vertical axis, which is preferably located in the region of the respective lighting unit.

By different angular rotation of the lighting units, smaller increments can be produced for example in the central region of the light exposure, that is to say sub-light exposures are arranged more closely to one another, and it may also be that more than two, for example three, sub-light exposures overlap with one another jointly. In this way, a higher resolution can be produced in the central region, that is to say smaller segments in the light exposure can be masked out than in the outer region. In addition, the maximum luminosity in the central region can thus be increased.

An optimisation of the light distribution is also possible when a plurality of different reflectors are used.

In particular, the entire lighting units, comprising the light source(s), reflector and possibly at least one shield, are preferably pivoted in each case. This has manufacturing advantages in view of a quick manufacture and saves costs accordingly.

However, it may also be that all light sources are oriented identically or are fixedly mounted beforehand and only the reflectors are rotated relative to one another or the reflectors are mounted in a manner rotated relative to the fixed arrangement. This is indeed more complex in terms of the manufacture, however manufacturing tolerances can be better compensated for here.

In order to minimise the shadowing by the LED covering, it is advantageous to form the beam path of the individual lighting units so as to intersect. The design as cross-beam emitters additionally has a positive effect on the degree of efficacy, since it leads to an improved containment of the light source. An improved containment means that the reflector can utilise a greater solid angle of the emission of the light source, in particular of the LED emission.

Here, by way of example, the degree of rotation may increase starting with an outer lighting unit with a continuation to the inner lighting unit.

The object according to the invention is additionally achieved with a headlight containing at least one above-described lighting device.

With a headlight system according to the invention of the type mentioned in the introduction, the left headlight may additionally produce the left part of the overall light distribution and the right headlight may produce the right part of the overall light distribution.

Here, the left and right part of the overall light distribution (as considered in the horizontal direction) preferably overlap in the middle.

By way of example, the overlap region of left and right light distribution is at approximately 3° in the horizontal direction. The greater the overlap region, the more difficult it is for segments in the overall light exposure to be masked out (completely) in this overlap region.

The invention is explained in greater detail hereinafter with reference to the drawing, in which

FIGS. 1-4 show different views of a lighting device 1 according to the invention for a motor vehicle, said lighting device comprising seven lighting units 2 in the shown example.

Here, the Figures show a left lighting device, and together with a right lighting device this headlight arrangement produces an overall light distribution for a motor vehicle.

Each lighting unit 2 comprises a reflector 3 and also a light source 4 paired with the reflector 3, such that light from the light source 4 is emitted into a region in front of the vehicle via the corresponding reflector 3 (in the installed state of the lighting device 1).

The reflecting surfaces of the reflectors may be smooth. In the shown embodiment, the reflectors 3, that is to say the reflecting surfaces thereof, are segmented. In the illustration according to FIGS. 1-4 the reflecting surfaces are each segmented into three horizontal segments 3a, 3b, 3c.

As can be clearly seen in the Figures, the reflectors are arranged directly opposite the light sources, to the side of the light sources. The light sources emit the light thereof substantially transversely, approximately at 90° to the primary emission direction (or, in the case of light sources in the form of LEDs, the 0-degree emission direction thereof is arranged approximately at 90° to the primary emission direction of the lighting unit).

The light sources 4 of the lighting units 3 each comprise at least one, preferably two or more, light-emitting diodes, and in the shown variant the light sources are arranged upright, that is to say the light exit surfaces are arranged in a vertical plane, that is to say light is fed to the reflectors 3 from the side.

Each lighting unit 2 forms a sub-light distribution, and the sub-light distributions of the seven lighting units 2 form a (overall) light distribution of the lighting device 1.

The sub-light distributions of the individual lighting units 2 are arranged here adjacently to one another in the horizontal direction, and the reflectors 3 of the lighting units 2 are designed in such a way that the sub-light distribution of each lighting unit 2 has at least one sharp vertical light-dark limit.

Here, "vertical" means that the LD boundary runs vertically with projection onto a vertical shield positioned in front of the lighting device, for example at a distance of 25 or 10 meters. Of course, this LD boundary lies in a generally horizontal plane in the light exposure on the carriageway. This is clearly evident to a person skilled in the art and is to serve here merely for clarification.

The light sources 4 of the individual lighting units 3 can be actuated independently of one another. In this way, the individual lighting units can be switched on and switched off independently of one another, and can possibly also be dimmed, such that the individual sub-light distributions of the lighting units can be switched on and switched off individually.

Furthermore, it may also be advantageous if, in the case that two or more light-emitting diodes are provided for a light source, the light-emitting diodes of a light source can also be actuated independently of one another or the light-emitting diodes of a light source are combined in groups and the individual groups can be actuated independently of one another.

By way of example, a light source may have one or more LED chips, each with one or more light-emitting diodes. The chips can be actuated or connected separately.

Each lighting unit thus produces one or more segments in the light exposure (depending on the number of independently actuatable chips), and these individual segments of a lighting unit can then also accordingly be controlled independently of the other segments.

By use of a number of LED chips (each of which comprises one or more light-emitting diodes) for a reflector, a number of light segments can be produced. Here, all reflector segments are paired with all LED chips, that is to say each light-emitting diode generally emits light substantially onto the entire reflector.

By way of example, an arrangement of an LED chip with a reflector (with or without segmentation) produces exactly one segment in the light distribution.

A number of LED chips with a reflector (with or without segmentation), wherein the LED chips cannot be actuated separately, likewise produce exactly one segment in the light distribution.

The use of a number of LED chips, for example a number of x LED chips, with a reflector (with or without segmentation), wherein the LED chips can be actuated separately, allows the production of x segments in the light distribution.

Depending on the arrangement of the segments on the reflector, these may form, for example, segments in the light distribution arranged adjacently to one another or one above the other.

In terms of the dimmability of the light sources, it may be particularly advantageous if at least the outer light sources can be dimmed. Here, the "outer" light sources (or lighting units) are those that produce the outer sub-light distributions, that is to say the sub-light distributions remote from the middle of the light distribution. In this way, the lateral extension of the light distribution of a lighting device can be optimally controlled.

In view of a simple and standardised construction of a lighting device, it is advantageous if, as illustrated in FIGS. 1-4, all light sources 4 are arranged on a common mounting body 10. Here, each light source 4 is preferably fitted on a dedicated heat sink 6, and light sources 4 mounted thereon accordingly form an interchangeable unit. These interchangeable units are supplemented by the corresponding reflectors 3 and are fastened on the mounting body 10.

In addition, it may also be advantageous if each light source 4 of a lighting unit 2 is paired with at least one beam shield 5.

An optically effective shield edge of the beam shield is portrayed in the light exposure, such that a sharper LD line can be produced. In addition, light that does not reach the reflector (due to the emission characteristics of the light-emitting diodes) is stopped by the beam shield, such that it cannot exit from the lighting unit.

The reflector is formed such that, even without a beam shield, a sharp light-dark boundary is produced in the light exposure. The beam shield is used in order to prevent a direct view of the light source. In addition, this beam shield can be used, by suitable positioning in the beam path and by suitable shaping, in order to change (optimise) the form of the vertical light-dark boundary. In addition, one or more further beam shields can be introduced into the beam path in order to shape (optimise) one or both vertical light-dark boundaries.

In the variant shown in FIGS. 1-4, exactly one such beam shield 5 is provided.

In order to produce a segmented light distribution, for example of a main beam distribution, it is advantageous if the reflectors 3 or lighting units 2 are arranged in a horizontal plane, as illustrated. The reflectors 3 or the lighting units 2 are also arranged adjacently in a row and are offset relative to one another in the light exit direction, as shown by way of example.

In principle, the sub-light distributions of adjacent lighting units 2 can be portrayed here at a distance from one another, bordering one another directly or overlapping one another.

In the shown embodiment, a preferred variant is shown in which the sub-light distributions overlap one another. In this way, a homogeneous light distribution can be produced with the lighting device, and, if the overlap region is selected accordingly, there still remains sufficient clearance to mask out individual segments or to selectively illuminate certain segments.

Figure 1:
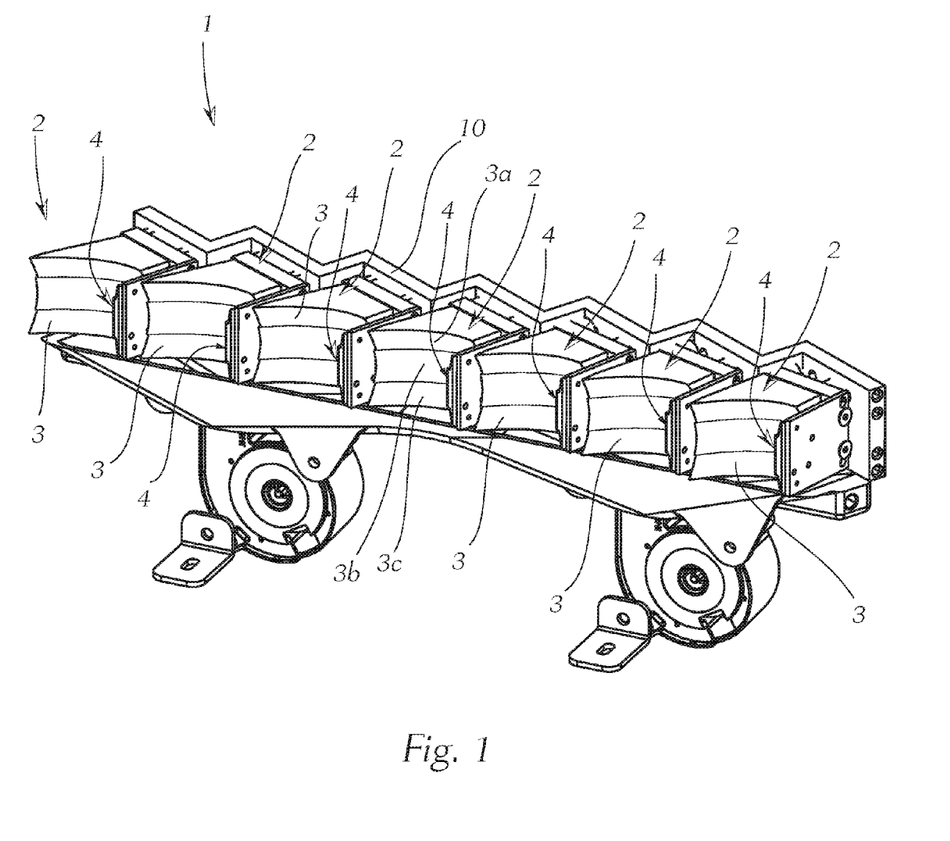
FIG. 1 shows a perspective view of a lighting device according to the invention obliquely from the front.
Figure 2:
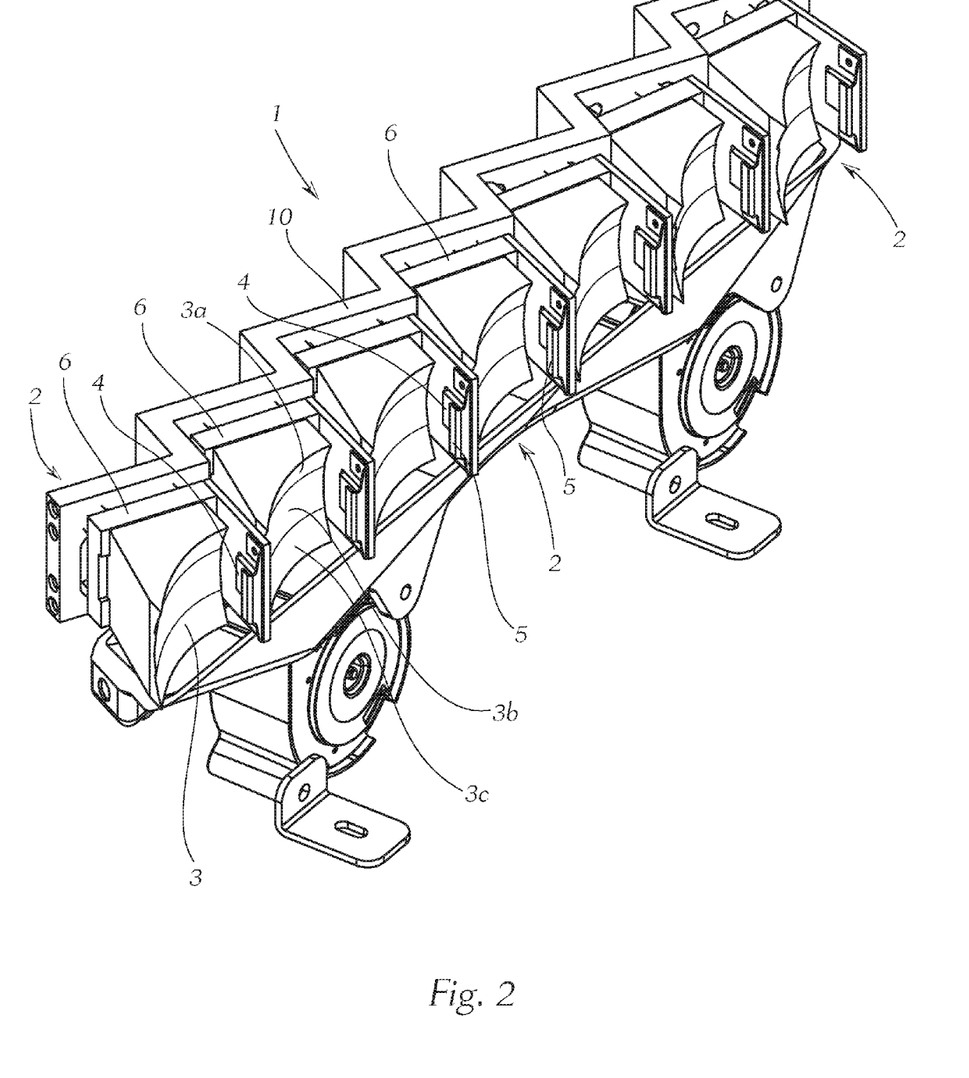
FIG. 2 shows the lighting device from FIG. 1 in another perspective view obliquely from the front.
Figure 3:
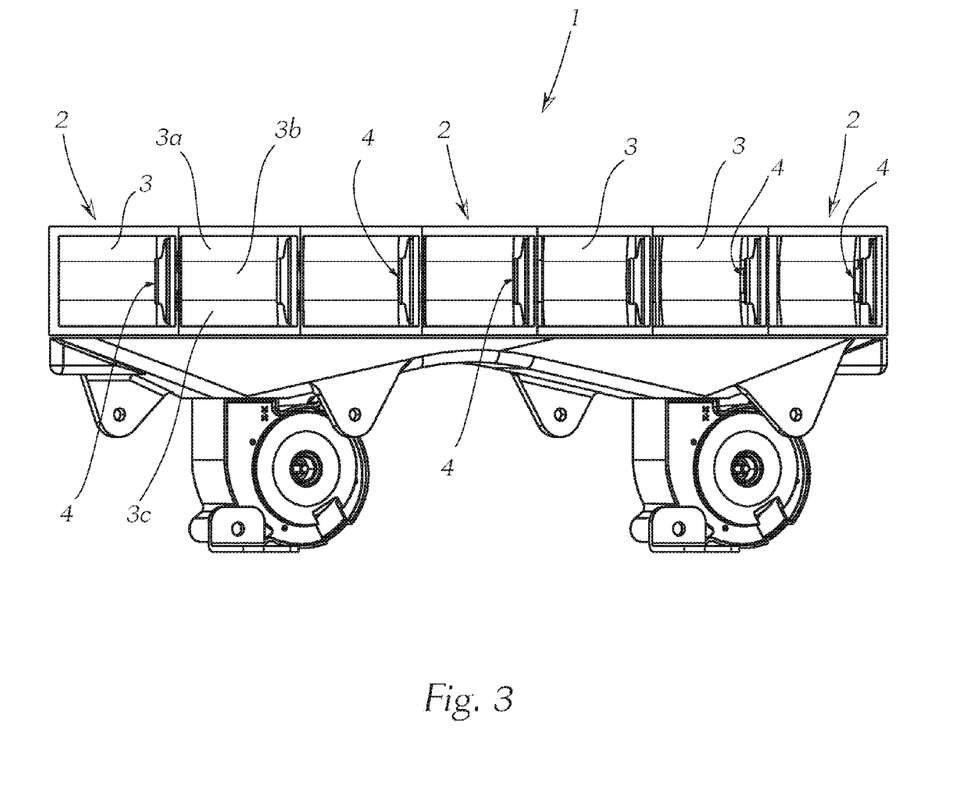
FIG. 3 shows the lighting device from FIG. 1 from the front.
Figure 4:
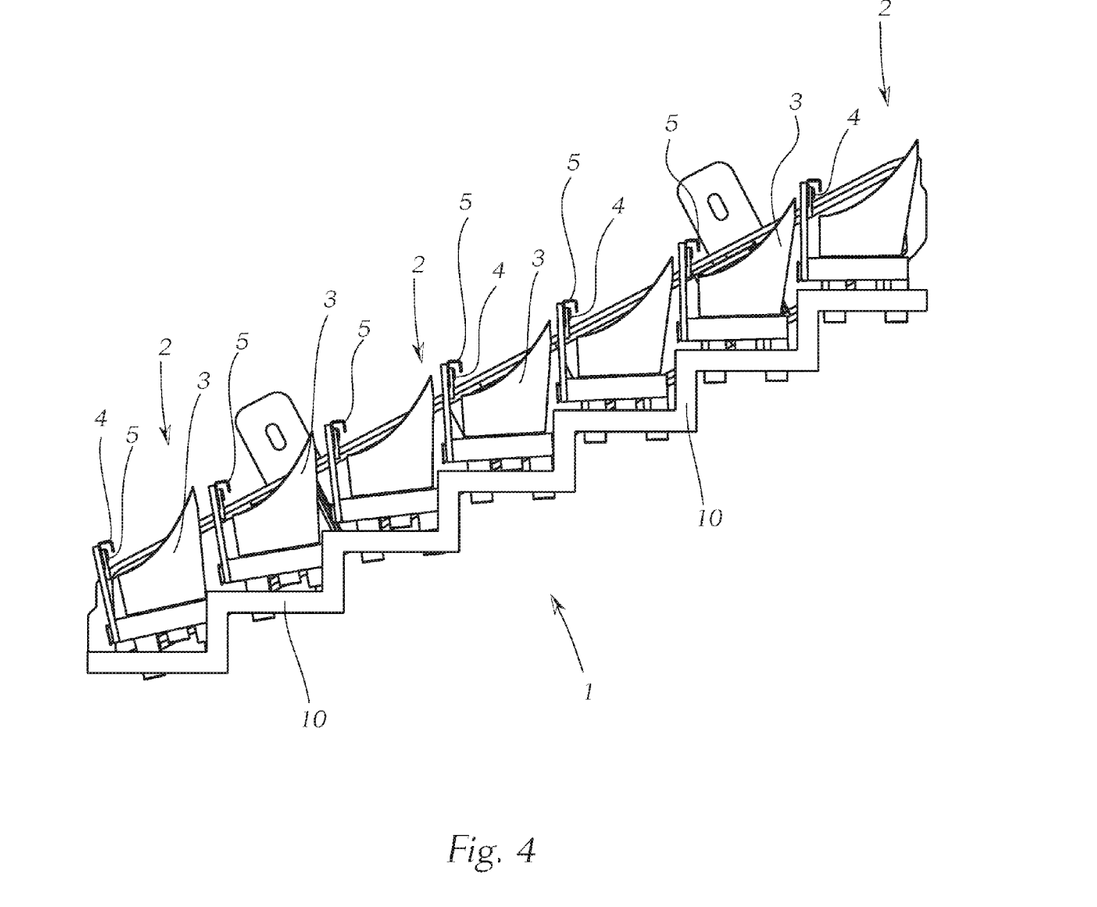
FIG. 4 shows the lighting device from FIG. 1 from above.
Figure 5:
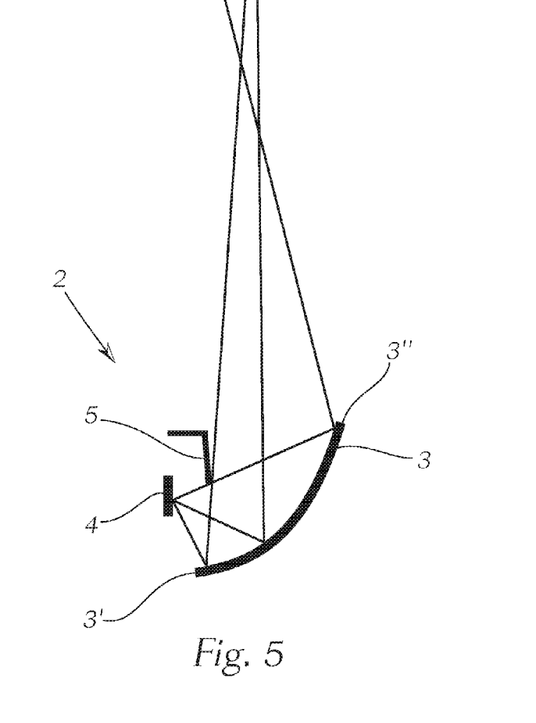
FIG. 5 shows a schematic view of a lighting unit from above.
Figure 6:
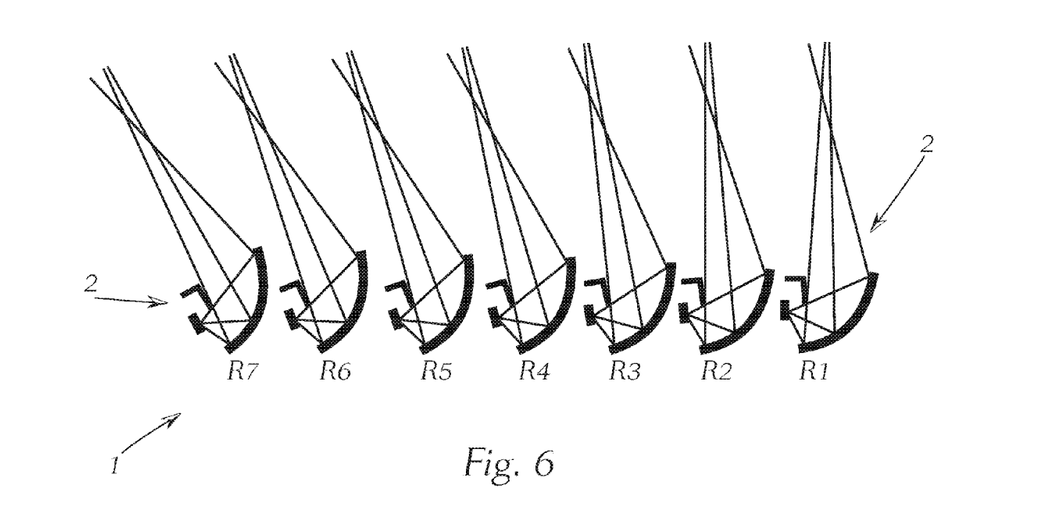
FIG. 6 shows a schematic view of the lighting units of a lighting device from above.

FIG. 5 shows a lighting unit 2 with reflector 3, light source 4 and beam shield 5 in a schematic view from above. Such a lighting unit 2 is used in a lighting device 1 (referred to hereinafter as a headlight 1), as shown in FIG. 6. FIG. 6 shows a left headlight for producing the left part of an overall light distribution, as will be explained in greater detail further below.

The reflector 3 is a cross-beam emitter, as can be clearly seen with reference to the illustrated beam path. In the case of the shown reflector 3, the reflector edge 3' is portrayed sharply in the sub-light exposure as a vertical light-dark boundary, wherein, if the arrangement is considered in the light exit direction, this edge 3' is located to the left and is portrayed in the light exposure as a right, inner vertical light-dark boundary as a result of the crossing beams. The left side of the sub-light distribution is portrayed less sharply.

Figure 7:
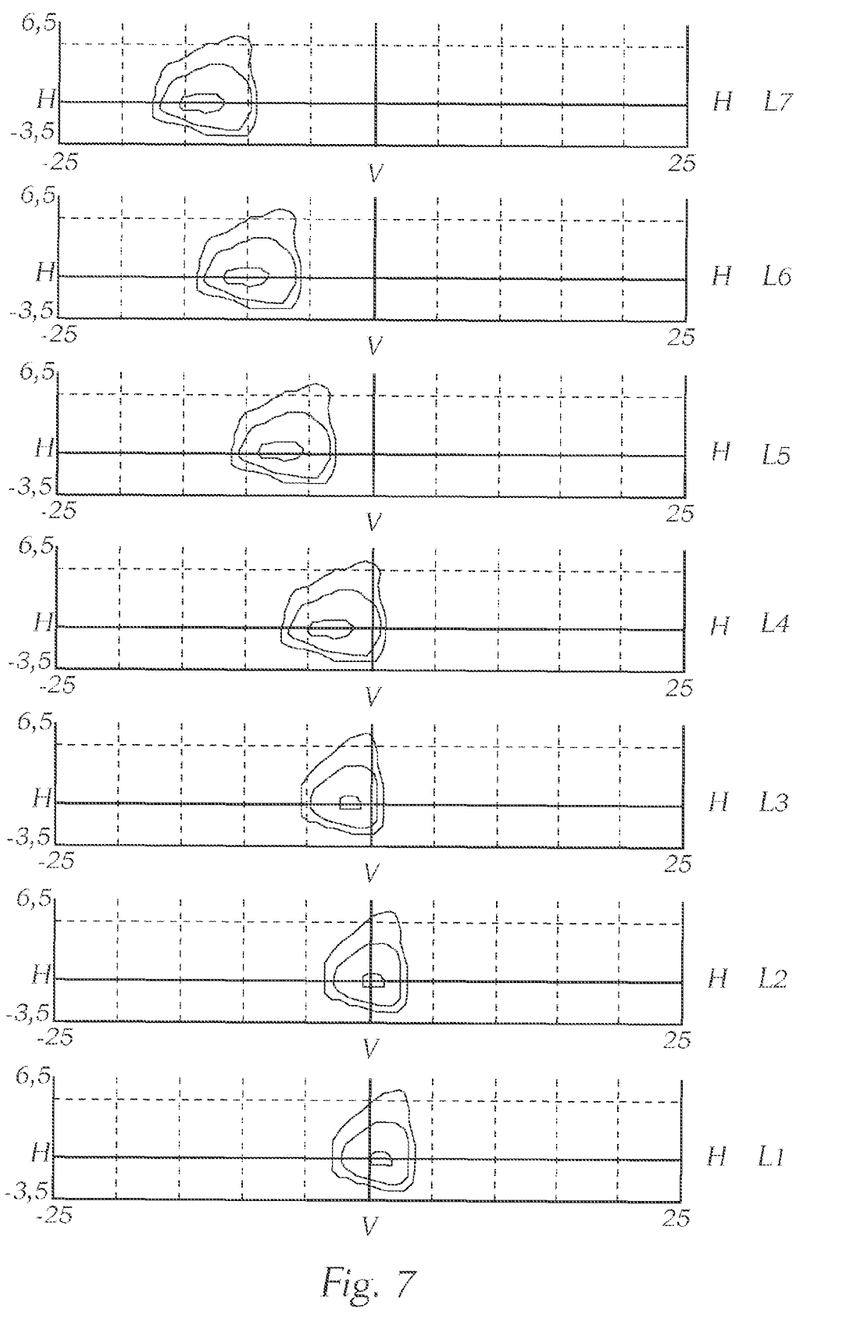
FIG. 7 shows the sub-light distributions produced with a lighting device.

FIG. 7 shows the sub-light distributions L1-L7, which are produced with the individual lighting units as illustrated in FIG. 6. Here, the lighting units are also denoted additionally by the reference signs R1-R7, wherein a lighting unit Ri (i=1–7) produces a sub-light distribution Li (i=1–7) in FIG. 8.

As can be seen in FIG. 7, the sub-light distributions L1-L7 have sharp right light-dark boundaries running vertically in a relatively straight line, which are produced by means of the left reflector edges 3' (see FIG. 5), whereas, on the left side, the sub-light distributions L1-L7 have a course running to the left; the right edge 3" of the reflector 3 is thus portrayed less sharply in this embodiment.

In order to achieve a higher intensity of the light distribution and a finer superimposition of the sub-light distributions in the inner region in the area around HV, the "inner" light distributions L1-L3 are advantageously narrower in the horizontal extension than the outer light distributions L4-L4, as shown, and the centre thereof is arranged less far from one another in the horizontal direction than that of the light distributions L4-L7. To this end, in the shown variant, the lighting units are rotated relative to one another in the horizontal direction, more specifically about a vertical axis preferably located in the region of the respective lighting unit or running through the lighting unit.

Specifically, the lighting units R1-R3 emit in a first direction, the lighting units R4-R7 are rotated relative to this first direction, and these lighting units emit light obliquely relative to the lighting units R1-R3. Accordingly, the sub-light distributions L1-L3 are narrower than the light distributions L4-L7, and in addition the light distributions R1-R3 are screened more finely.

Due to the different angles of rotation of the lighting units, smaller increments can thus be produced in the central region of the light exposure, that is to say sub-light exposures are arranged closer to one another, and it may also be that more than two, for example three, sub-light exposures overlap with one another jointly. In this way, a higher resolution can be produced in the central region, that is to say smaller segments can be masked out in the light exposure than in the outer region. In addition, the maximum luminosity in the central region can thus be increased.

Lighting units that are constructed identically in principle with identical reflectors can be used. However, differently formed reflectors can also be used. An optimal adaptation is of course then possible if a large number of different reflectors are used. However, in order to minimise the number of tools and therefore the costs and additionally the variety of components, it is sought to use a minimum number of different reflectors, for example 2 different types of reflectors.

With the design, installation space and performance are also to be taken into account. Larger reflectors generate a higher maximum and have a higher efficiency, whereas smaller reflectors are advantageous for reducing installation space.

For the central region of the light distribution of a lighting device, wider reflectors that produce a narrower light exposure with higher intensity and allow a finer superimposition of the individual segments of the light distribution are advantageous, whereas narrower reflectors are preferably used in the outer region of the light distribution for a broader light exposure for broader illumination, as is also the case in the variant shown in the figures. The necessary installation space can additionally be reduced by the smaller width of the reflectors.

Referring once again to FIG. 5, this shows a lighting unit 2, of which the reflector 3 is formed as a cross-beam emitter. The beam shield 5 prevents a direct view of the light source 4. Scattered light is thus prevented from being produced outside the desired sub-light distribution, and for example may lead to a dazzling of the oncoming traffic with partial main beam operation.

This beam shield 5 can be used as a result of suitable design (position and contour of the edge) in order to shape, that is to say to optimise (to form more sharply), the vertical LD line of the light distribution.

In the case of an intersected beam path, as is shown in FIG. 5, the light-dark boundary of the light distribution opposite the beam shield is influenced, that is to say in this case the right light-dark boundary of the sub-light distribution.

Figure 8:
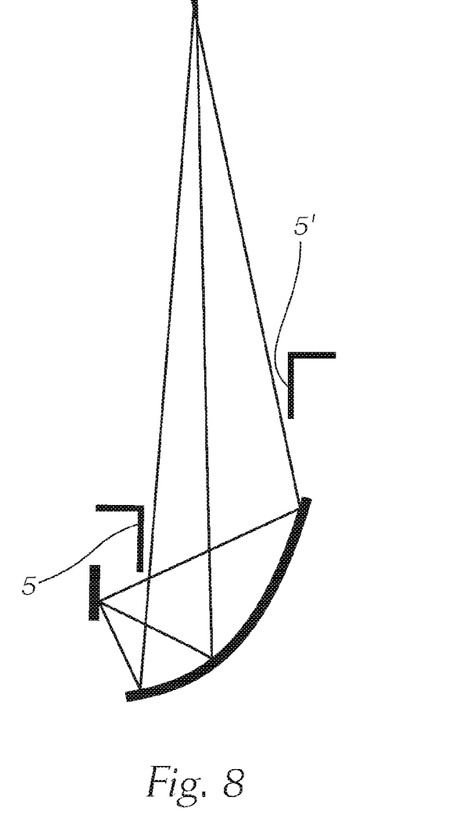
FIG. 8 shows a lighting unit from FIG. 6 with two beam shields.

In addition, a second beam shield 5' can be used in order to also optimise/make sharper the second vertical light-dark limit (see FIG. 8).

Figure 9:
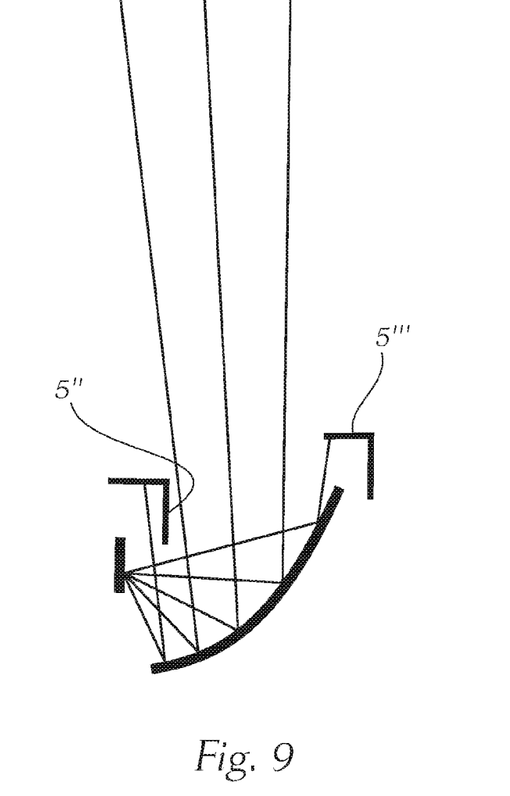
FIG. 9 shows a lighting unit with widened beam path and two beam shields.

FIG. 9 lastly also shows a lighting unit, of which the reflector produces a widened beam path. If beam shields 5", 5''' are used here, the light-dark boundary of the light distribution arranged on the side of the beam shield is thus influenced hereby.

Figure 10:
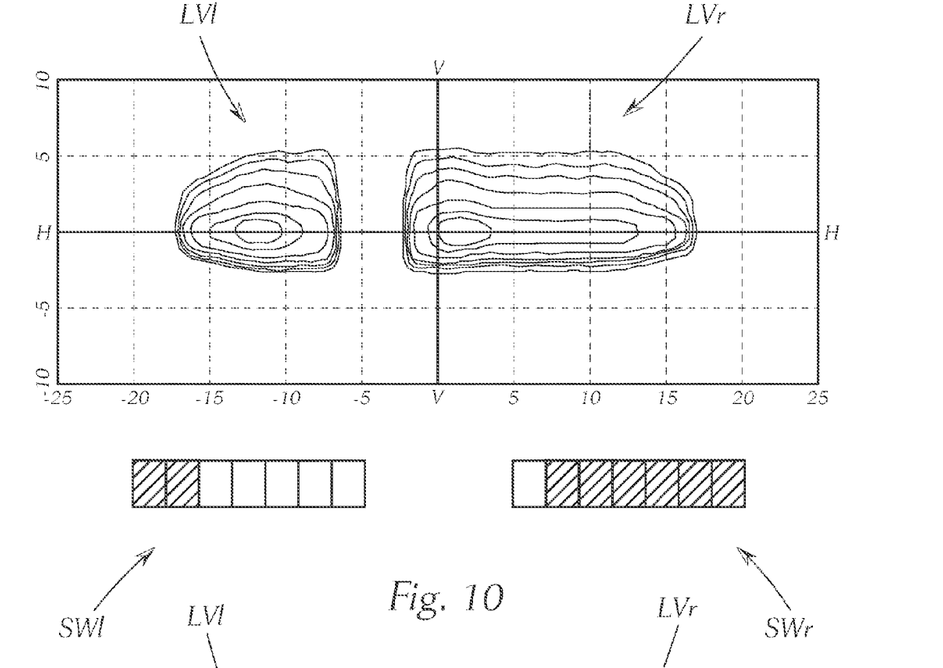
FIG. 10 shows an overall light distribution produced with two lighting devices and with masked-out segment.
Figure 11:
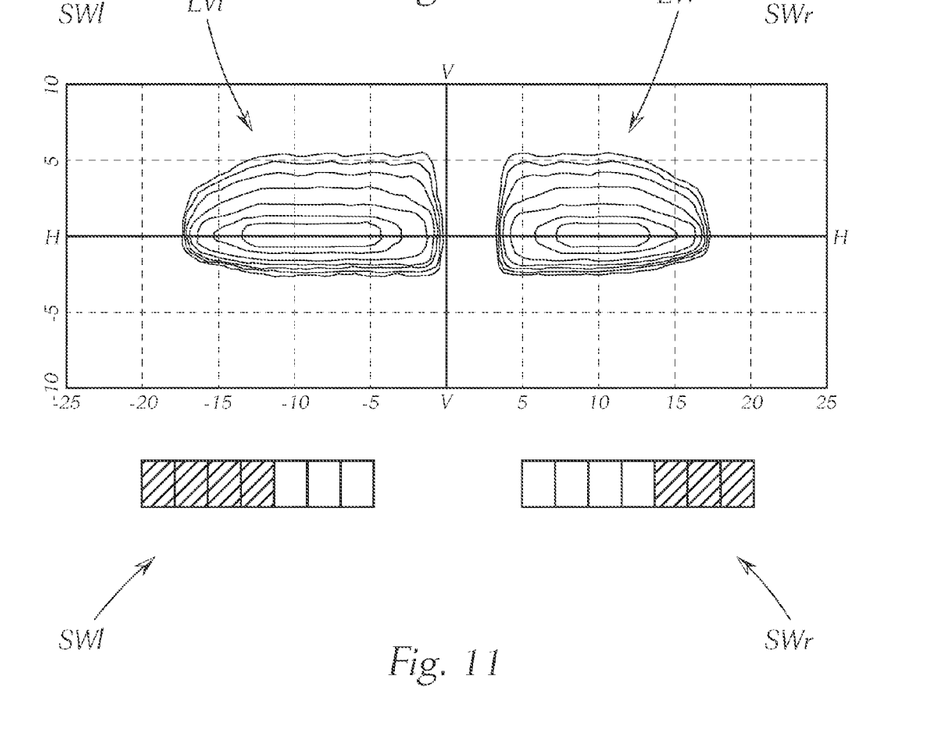
FIG. 11 shows the overall light distribution from FIG. 8, with a different masked-out segment.

FIG. 10 and FIG. 11 show a main beam produced with a headlight system consisting of a left and a right headlight, wherein each headlight comprises a lighting device according to the invention, for example with 7 lighting units.

The left headlight SWl produces the left light distribution LV1, the right headlight SWr produces the right light distribution LVr. As indicated schematically, each headlight SW1, SWr has 7 lighting units, which produce the respective light distribution in the superimposition.

Here, the left and right part LV1, LVr of the overall light distribution (as considered in the horizontal direction) preferably overlap in the middle. By way of example, the overlap region of left and right light distribution is arranged at approximately 3° in the horizontal direction. The greater the overlap region, the more difficult can segments in the overall light exposure be masked out (completely) in this overlap region.

As is indicated in FIG. 10, with the left headlight SW1, only the two outer lighting units are activated (illustrated in a hatched manner), and with the right headlight SWr, all lighting units are illuminated apart from the innermost lighting unit. The overall light distribution shown in FIG. 10 with a masked-out region in the light exposure is thus produced, and the vertical light-dark boundaries for clear delimitation between illuminated and unilluminated region can be clearly seen.

FIG. 11 shows an overall light distribution in which the four outermost lighting units of the left headlight SW1 are activated, and in the case of the right headlight SWr the three outermost lighting units are activated. Accordingly, the masked-out region is located in the right part of the overall light distribution.

The lighting device claimed here can meet the conventional legal provisions, for example of the SAE, CCC or ECE regulation.

The invention claimed is:

1. A lighting device (1) for a motor vehicle, comprising two or more lighting units (2), wherein each lighting unit (2) comprises:
   at least one reflector (3) and at least one light source (4) paired with the at least one reflector (3),
   wherein light from the at least one light source (4) is emitted into a region in front of the vehicle via the corresponding at least one reflector (3) in the installed state of the lighting device (1), and
   wherein sub-light distributions of the two or more lighting units (2) form a light distribution of the lighting device (1),
   wherein the sub-light distributions of the individual lighting units (2) are arranged adjacently to one another in the horizontal direction, and wherein the reflectors (3) of the lighting units (2) are designed in such a way that the sub-light distribution of each lighting unit (2) has at least one sharp vertical light-dark boundary,
   wherein the reflectors (3) are divided into groups each having at least one reflector, and wherein the reflectors are designed in such a way that the lighting units (2) with reflectors of a group produce a sub-light exposure of substantially identical form, and the sub-light exposures of the lighting units (2) with reflectors from different groups differ from one another, and
   wherein each light source (4) of a lighting unit is paired with at least one beam shield (5).

2. The lighting device according to claim 1, wherein the sub-light distributions of adjacent lighting units (2) are portrayed at a distance from one another, bordering one another directly or overlapping one another.

3. The lighting device according to claim 1, wherein at least one of the reflectors (3) is designed in such a way that the sub-light distribution has exactly one vertical light-dark boundary.

4. The lighting device according to claim 1, wherein at least one of the reflectors (3) is designed in such a way that the sub-light distribution has two vertical light-dark boundaries.

5. The lighting device according to claim 1, wherein the reflectors (3) are designed in such a way that all lighting units (2) produce a sub-light exposure of substantially identical form.

6. The lighting device according to claim 1, wherein one or more of the reflectors (3) have a reflecting surface that is segmented.

7. The lighting device according to claim 1, wherein the light sources (4) of the lighting units (3) each comprise at least one light-emitting diode.

8. The lighting device according to claim 1, wherein the light sources (4) of the lighting units (3) can be actuated independently of one another.

9. The lighting device according to claim 8, wherein each of the light sources comprise two or more light-emitting diodes, wherein the light-emitting diodes can be actuated independently of one another or the light-emitting diodes are combined in groups and the individual groups can be actuated independently of one another.

10. The lighting device according to claim 1, wherein one or more of the light sources (4) can be dimmed.

11. The lighting device according to claim 10 wherein one or more outer light sources can be dimmed.

12. The lighting device according to claim 1, wherein all light sources (4) are arranged on a common mounting body.

13. The lighting device according to claim 1, wherein the reflectors (3) or lighting units (2) are arranged in a horizontal plane.

14. The lighting device according to claim 1, wherein the lighting units (2) are oriented identically.

15. The lighting device according to claim 1, wherein the lighting units (2) are rotated relative to one another in the horizontal direction.

16. The lighting device according to claim 15, wherein the degree of rotation increases starting with an outer lighting unit (2) with a continuation to inner lighting units (2).

17. A headlight for a motor vehicle, comprising at least one lighting device (1) according to claim 1.

18. A headlight system for producing an overall light distribution, comprising a left headlight and a right headlight each according to claim 17.

19. The headlight system according to claim 18, wherein the left headlight produces a left part of the overall light distribution and the right headlight produces a right part of the overall light distribution.

20. The headlight system according to claim 19, wherein the left and right parts of the overall light distribution overlap in the middle, as considered in the horizontal direction.

21. The lighting device according to claim 3, wherein all of the reflectors are designed such that the sub-light distributions have exactly one vertical light-dark boundary.

22. The lighting device according to claim 4, wherein all of the reflectors are designed such that the sub-light distributions have exactly two vertical light-dark boundaries.

23. The lighting device according to claim 7, wherein the light sources of the lighting units each comprise two or more light-emitting diodes.

24. The lighting device according to claim 10, wherein the one or more light sources which can be dimmed comprise light emitting diodes which can be dimmed.

* * * * *